United States Patent
Bates et al.

(10) Patent No.: US 7,440,428 B2
(45) Date of Patent: Oct. 21, 2008

(54) METHOD AND SYSTEM FOR PERSISTING CONTENT IN DECENTRALIZED NETWORK

(75) Inventors: John P. Bates, Redwood City, CA (US); Payton R. White, Foster City, CA (US); Gregory Corson, San Mateo, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 857 days.

(21) Appl. No.: 10/857,424

(22) Filed: May 27, 2004

(65) Prior Publication Data

US 2004/0246921 A1 Dec. 9, 2004

Related U.S. Application Data

(60) Provisional application No. 60/476,084, filed on Jun. 4, 2003.

(51) Int. Cl.
*H04L 12/28* (2006.01)

(52) U.S. Cl. .................. 370/329; 370/400; 709/201

(58) Field of Classification Search ............ None
See application file for complete search history.

(56) References Cited

U.S. PATENT DOCUMENTS 6,311,209 B1  10/2001  Olsen et al.
7,065,579 B2 *  6/2006  Traversat et al. ............ 709/230
2002/0156893 A1  10/2002  Pouyoul et al.
2004/0098447 A1 *  5/2004  Verbeke et al. .............. 709/201

FOREIGN PATENT DOCUMENTS

WO    WO-01/82678 A2    11/2001

OTHER PUBLICATIONS

Ratnasamy et al, A Scalable Content-Addressable Network, ACM, pp. 161-172, Aug. 2001.*
Traversat et al, Project JXTA Virtual Network, Sun Microsystems, Inc., pp. 1-10, Oct. 2002.*
Foster et al, A Peer-to-Peer Approach to Resource Discovery in Grid Environments, University of Chicago, pp. 1-13, Mar. 2002.*
Phan et al, Challenge: Integrating Mobile Wireless Devices Into the Computational Grid, ACM, pp. 1-8, 2002.*

* cited by examiner

*Primary Examiner*—Frank Duong
(74) *Attorney, Agent, or Firm*—Martine Penilla & Gencarella, LLP

(57) ABSTRACT

Methods are provided to ensure that content defining a sub-grid of a decentralized network continues to be provided to the sub-grid upon departure of a node from the sub-grid that has been responsible for providing the content. A node intent on exiting a sub-grid ensures that content for which it has service responsibility is appropriately transferred to another node prior to exiting the sub-grid, wherein the other node is capable of serving the transferred content to the sub-grid.

48 Claims, 6 Drawing Sheets

METHOD AND SYSTEM FOR PERSISTING CONTENT IN DECENTRALIZED NETWORK

CROSS-REFERENCE TO RELATED APPLICATIONS

This application claims priority from U.S. Provisional Patent Application No. 60/476,084, filed on Jun. 4, 2003, and entitled "Virtual/Real World Dynamic Intercommunication Methods and Systems," which is incorporated herein by reference. This application is also related to U.S. patent application Ser. No. 10/856,565, filed on even date herewith and entitled "System and Method for Notification within Decentralized Network," which is incorporated herein by reference.

BACKGROUND

1. Field of the Invention

The present invention relates generally to data communication across a decentralized network of computing resources.

2. Description of the Related Art

A decentralized computing environment is defined by a number of computing systems interconnected to communicate with one another, wherein each computing system can perform both client and server functions. A peer-to-peer (P2P) network represents a decentralized computing environment in which each computing system within the P2P network is defined as a peer of every other computing system within the network. For discussion purposes, each peer computing system within the P2P network is referred to as a node. Each node within the P2P network is configured to execute software having substantially equivalent functionality. Therefore, each node is enabled to act as both a provider and a user of data and services across the P2P network.

Nodes within the P2P network are generally linked together through communication channels to form grids of communication. In a fully connected grid (FCG), each node is connected to communicate directly with each of the other nodes within the FCG. In the distributed P2P network environment, nodes having a common interest can be connected to form a FCG representing a sub-grid of interest. Each node within the sub-grid of interest is generally responsible for publishing some content related to the particular interest. The cumulative content published by each node within the sub-grid of interest defines a scope of the sub-grid. Additionally, the sub-grid of interest represents a dynamic entity in which participating nodes are capable of entering and exiting at will. Since the scope of the sub-grid is defined by the cumulative published content of the connected nodes, the scope of the sub-grid can be negatively impacted by the exit of a node and a corresponding loss of its published content.

In view of the foregoing, a solution is needed to ensure that published content within a sub-grid of interest will persist despite changes in the sub-grid structure.

SUMMARY

The present invention provides for persistence of content within a sub-grid of a decentralized network. More specifically, when a node, i.e., peer, of the decentralized network participating in the sub-grid decides to exit the sub-grid, the present invention ensures that content having been provided by the node to the sub-grid continues to be provided to the sub-grid. In a first scenario, the node exiting the sub-grid is one of a plurality of nodes participating in the sub-grid. In the first scenario, content of the exiting node is transferred to another node participating in the sub-grid, wherein the other node is capable of providing the transferred content to the sub-grid. In various embodiments, selection of the node to provide the transferred content to the sub-grid can be performed randomly or in accordance with a set of guidelines. In a second scenario, the node exiting the sub-grid is the only node remaining in the sub-grid. In one embodiment associated with the second scenario, the node exiting the sub-grid establishes a partial presence within the sub-grid to ensure that the content is not lost. In another embodiment associated with the second scenario, the node exiting the sub-grid selects a volunteer node from outside the sub-grid to continue providing the content to the sub-grid. In accordance with the present invention, a node intent on exiting a sub-grid should ensure that content for which it has service responsibility is appropriately transferred to another node prior to exiting the sub-grid, wherein the other node is capable of serving the transferred content.

In one embodiment, a method for ensuring persistence of content within a sub-grid of a decentralized network is disclosed. The method includes operating a first node within the sub-grid, wherein the first node is responsible for providing content to the sub-grid. The method also includes selecting a second node to provide content, for which the first node is responsible, to the sub-grid. The method further includes transferring the content for which the first node is responsible from the first node to the second node. The first node is then caused to exit the sub-grid. Additionally, the second node is operated to provide the content transferred from the first node.

In one embodiment, a computer readable media including program instructions for ensuring persistence of content within a sub-grid of a decentralized network is disclosed. The computer readable media includes program instructions for operating a first node to provide content to the sub-grid. Program instructions are also included for selecting a second node to provide content, for which the first node is responsible, to the sub-grid. Also, program instructions are included for transferring the content for which the first node is responsible from the first node to the second node. In accordance with additional program instructions, the first node is operated to exit the sub-grid. Program instructions are further provided for operating the second node to provide the content transferred from the first node.

In one embodiment, a method for ensuring persistence of content within an empty sub-grid is disclosed. The method includes operating a first node within a sub-grid, wherein the sub-grid does not currently include nodes other than the first node. Also, the first node is responsible for providing content to the sub-grid. The method also includes operating the first node to establish a partial presence within the sub-grid. The partial presence enables the first node to cease operation within the sub-grid while retaining the content that the first node has been providing to the sub-grid.

In one embodiment, a computer readable media including program instructions for ensuring persistence of content within an empty sub-grid is disclosed. The computer readable media includes program instructions for operating a first node within the sub-grid, wherein the sub-grid does not currently include nodes other than the first node. Also, the first node is responsible for providing content to the sub-grid. Program instructions are further provided for operating the first node to establish a partial presence within the sub-grid. The partial presence enables the first node to cease operation within the sub-grid while retaining the content that the first node has been providing to the sub-grid.

In one embodiment, a computing device is disclosed. The computing device includes a processor and a memory capable of storing program instructions to be executed by the processor. The program instructions include computer code for providing content within a sub-grid of a peer-to-peer network. The program instructions also include computer code for selecting another computing device to which responsibility for providing the content within the sub-grid can be passed. The program instructions further include computer code for transferring the content to a selected computing device. Additionally, the program instructions include computer code for enabling the computing device to disconnect from the sub-grid upon successfully transferring the content to the selected computing device.

In one embodiment, a decentralized network is disclosed. The decentralized network includes a plurality of interconnected nodes forming a sub-grid. Each of the plurality of interconnected nodes are capable of providing content to the sub-grid. The decentralized network also includes a content persistence service deployed to operate on each of the plurality of interconnected nodes. The content persistence service is capable of ensuring that content provided by a node to the sub-grid will be retained within the sub-grid upon departure of the node from the sub-grid.

In one embodiment, a content persistence mechanism for deployment across a decentralized network is disclosed. The mechanism includes means for operating a first node to provide content within a sub-grid of the decentralized network. Means are also provided for selecting a second node to continue providing the content within the sub-grid upon departure of the first node from the sub-grid. The mechanism also includes means for transferring the content from the first node to the second node. Further, means are provided for causing the first node to depart the sub-grid. Means are also provided for operating the second node to provide the content transferred from the first node.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION

The present invention provides for persistence of content within a sub-grid of a decentralized network. More specifically, when a node, i.e., peer, of the decentralized network participating in the sub-grid decides to exit the sub-grid, the present invention ensures that content having been provided by the node to the sub-grid continues to be provided to the sub-grid. In a first scenario, the node exiting the sub-grid is one of plurality of nodes participating in the sub-grid. In the first scenario, content of the exiting node is transferred to another node participating in the sub-grid, wherein the other node is capable of providing the transferred content to the sub-grid. In various embodiments, selection of the node to provide the transferred content to the sub-grid can be performed randomly or in accordance with a set of guidelines. In a second scenario, the node exiting the sub-grid is the only node remaining in the sub-grid. In one embodiment associated with the second scenario, the node exiting the sub-grid establishes a partial presence within the sub-grid to ensure that the content is not lost. In another embodiment associated with the second scenario, the node exiting the sub-grid selects a volunteer node from outside the sub-grid to continue providing the content to the sub-grid. In accordance with the present invention, a node intent on exiting a sub-grid should ensure that content for which it has service responsibility is appropriately transferred to another node prior to exiting the sub-grid, wherein the other node is capable of serving the transferred content.

It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1A:
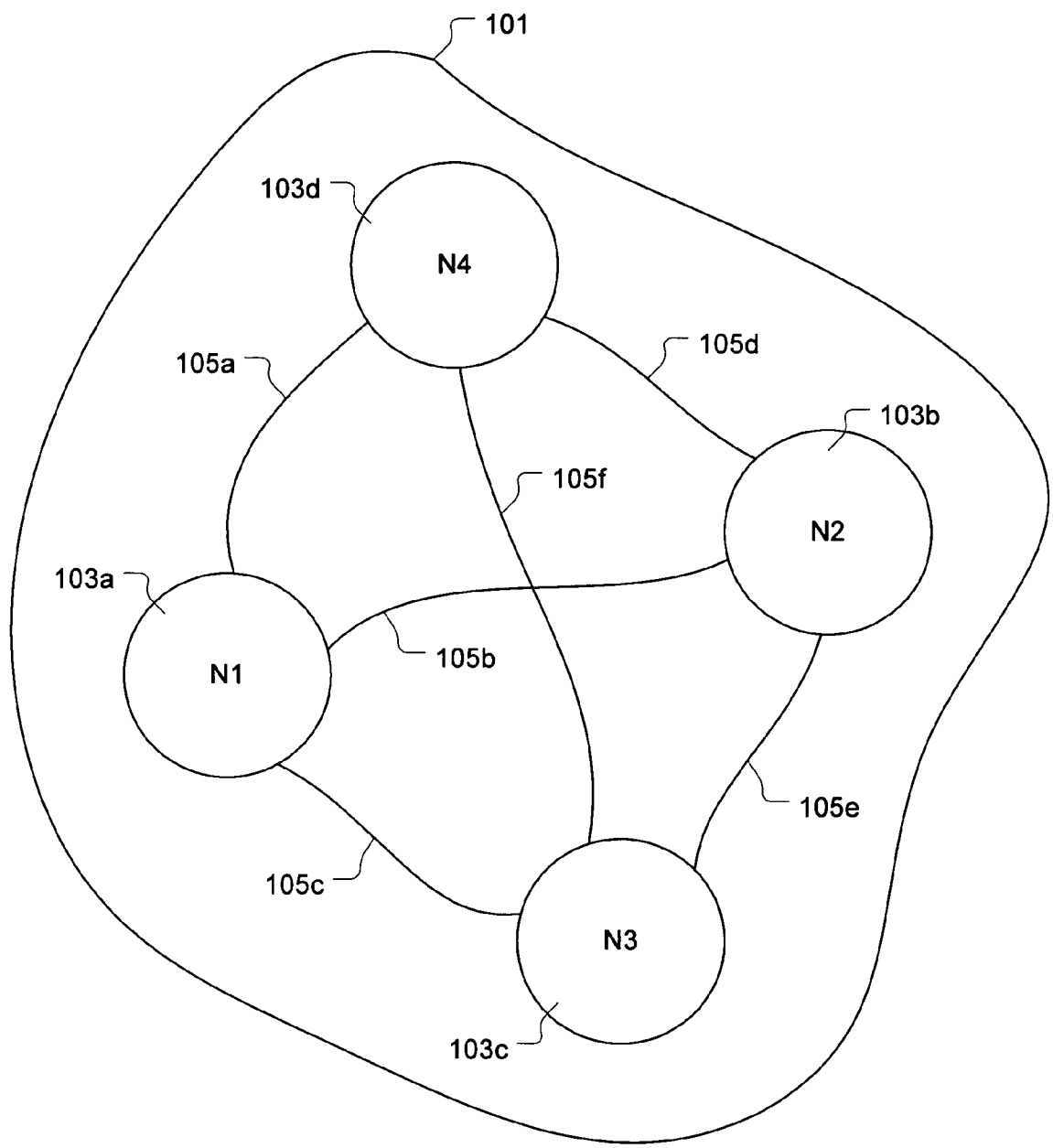
FIG. 1A is an illustration showing an exemplary P2P network, in accordance with one embodiment of the present invention.

FIG. 1A is an illustration showing an exemplary P2P network 101, in accordance with one embodiment of the present invention. The exemplary P2P network includes four nodes N1 (103a), N2 (103b), N3 (103c), and N4 (103d), wherein each node is interconnected by links 105a-105f to communicate with the other nodes in the P2P network 101. It should be appreciated, however, that the exemplary P2P network 101 represents one of an essentially limitless number of possible P2P network configurations. For example, other P2P network embodiments can include any number of nodes. Also, in other P2P network embodiments, each node in the P2P network may be connected to communicate directly with a subset of the other nodes within the P2P network, rather than with all of the other nodes within the P2P network. Additionally, some P2P networks may require communication between certain nodes to be propagated through one or more intermediate nodes. For example, the nodes of the P2P network may be connected in a ring-like manner such that each node is connected to a predecessor node and a successor node. Thus, in this example, communication between two nodes may require propagation around the ring-like P2P network by intermediate nodes. For discussion purposes, the present invention is described herein in the context of the exemplary P2P network 101 as shown in FIG. 1A. It should be understood, however, that the principles of the present invention as described herein are equally applicable to any other P2P network configuration.

Figure 1B:
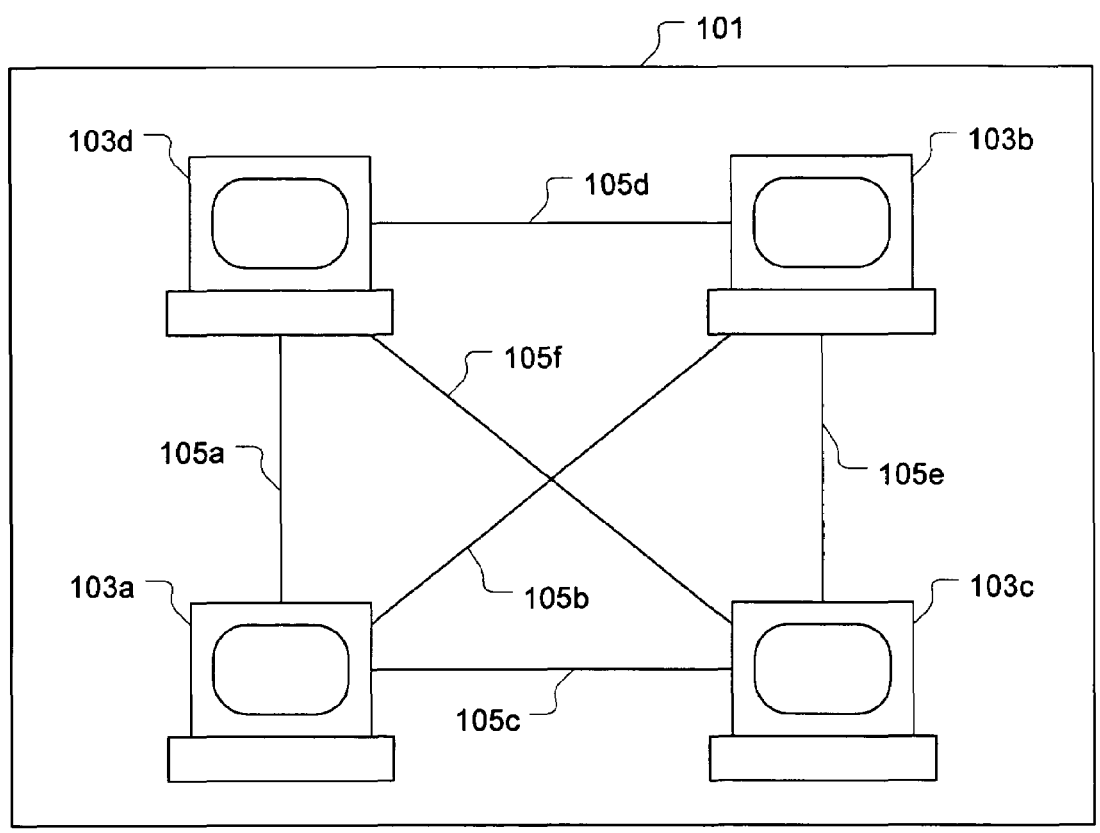
FIG. 1B is an illustration showing the exemplary P2P network in which each node is depicted as a computing system, in accordance with one embodiment of the present invention.

It should be appreciated that each node 103a-103d of the P2P network 101, represents a computing system. FIG. 1B is an illustration showing the exemplary P2P network 101 in which each node is depicted as a computing system, in accordance with one embodiment of the present invention. In one embodiment, each computing system has essentially equivalent computing capability and operates software providing essentially equivalent functionality. However, in other embodiments, the various computing systems may differ in terms of computing capability. Regardless of the particular embodiment, however, each computing system includes at least a processor, a memory, and a communication interface. Additionally, each computing system can include other common computer components and peripheral devices, such as storage components, display components, user interface components, etc. In various embodiments, communication between the nodes 103a-103d can be enabled by a wireless network, a physical network, or a combination thereof, as known to those skilled in the art.

Each node within the P2P network includes software ("P2P service software) and logic to enable navigation of the P2P network and communication between nodes within the P2P network. Within the P2P network, a number of nodes can operate to form a sub-grid based around a common interest. For example, consider the common interest as being represented by a particular virtual environment within a gaming application. The particular virtual environment is supported by a sub-grid within the P2P network. The sub-grid is formed by a number of nodes representing participants of the gaming application that are present within the particular virtual environment. Each node in the sub-grid is responsible for providing a portion of the content, i.e., data, defining the particular virtual environment. It should be appreciated that the abovementioned example, regarding the particular virtual environment within the gaming application, represents one of an essentially limitless number of interests about which a sub-grid can be defined within the P2P network. Regardless of the particular interest associated with a sub-grid, nodes within the sub-grid operate in a cooperative manner to provide the content necessary to completely define the interest.

One feature of the P2P network is that each connected node is capable of entering and leaving the P2P network at will. This freedom of node presence/movement, is also applicable to sub-grids defined within the P2P network. However, since each node within the sub-grid is responsible for providing a portion of the content necessary to define the interest associated with the sub-grid, it is necessary that each node within the sub-grid also provide a commitment to preserve the integrity of the content defining the interest. Therefore, when a node joins the sub-grid, the node commits to preserve the integrity of the content that it is responsible for providing to the sub-grid. Essentially, preserving the integrity of content for which a node is responsible involves ensuring that the content persists during the node's presence in the sub-grid and following the node's departure from the sub-grid. As will be discussed below, the present invention provides a number of methods by which a node can preserve the integrity of content for which it is responsible.

In accordance with the present invention, when a node, i.e., user or participant, of a sub-grid serves content in the sub-grid, the user should continue to serve that content until it can hand off responsibility for serving the content to another node, i.e., peer, having the resources to serve the content. It should be understood that content served by the node can represent content created by the node or content assigned to the node. Thus, a node intent on exiting a sub-grid should ensure that content, for which it has service responsibility, is appropriately transferred to another node prior to exiting the sub-grid, wherein the other node is capable of serving the transferred content. The principle of the present invention as described above is particularly well-defined for ensuring persistence of content that includes live, real-time behavior.

There are two primary scenarios to consider in persisting content within a sub-grid. In the first scenario, the node intent on exiting the sub-grid (the "exiting node") is one of a number of nodes actively connected to the sub-grid. Thus, in the first scenario, there are other nodes within the sub-grid to which the exiting node can transfer its content responsibility. In the second scenario, the exiting node is the only actively connected node in the sub-grid. Thus, in the second scenario, there are no other nodes within the sub-grid to which the exiting node can transfer its content responsibility.

With respect to the first scenario, when the node responsible for providing particular content wants to exit the sub-grid, the node passes responsibility for providing the particular content to another node within the sub-grid. The node selected to serve the content of the departing node can be selected randomly or in accordance with a set of guidelines. When performing a random node selection, each node in the sub-grid is given an equal probability of being selected. However, when performing a guideline-based node selection, characteristics of each node are evaluated in accordance with the set of guidelines to determine which node represents an appropriate selection for serving the content of the departing node. The set of guidelines for selecting a node to serve the content of a departing node can vary significantly from one sub-grid to another. The following discussion presents a number of examples of guidelines that can be applied in selecting a node to persist content within the sub-grid. It should be appreciated, however, that the following guideline examples are not inclusive, and that other guidelines can be equally applied in alternative embodiments of the present invention.

In one example, the set of guidelines for selecting a node to persist content within the sub-grid is established based on a principle of preserving a load balance among nodes connected to the sub-grid. In the present example, the term "load" is used to describe an amount of content being served to the sub-grid by a given node. Thus, in an exemplary implementation of load balancing guidelines, a connected node that is currently providing less content to the sub-grid, relative to other connected nodes, can be selected to serve, i.e., persist, the content of the node that is departing the sub-grid.

In one embodiment, each node connected within the sub-grid maintains a list of content being provided by each of the other nodes connected within the sub-grid. The list of provided content associated with each node can be examined to determine which node is providing the least amount of content to the sub-grid. Based on this examination, the node providing the least amount of content can be designated to provide the content of the departing node.

In another embodiment, each node connected within the sub-grid maintains a load indicator that is visible to each of the other nodes connected within the sub-grid. The load indicator associated with a given node provides an indication of the amount of content currently being provided to the sub-grid by the given node. In one example, the load indicator can be a value within a finite range, e.g., from 1 to 10, wherein the value represents a load of the associated node relative to the other nodes within the sub-grid. In another example, the load indicator can be a value corresponding to the number of objects the associated node is currently providing to the sub-grid. In another example, considering that some objects represent less data than others, the load indicator can be a value representing the cumulative amount of data the associated node is currently providing to the sub-grid. In a further example, considering that some objects are requested more than others, the load indicator can be a value representing the cumulative amount of data requested from the associated node within a given period of time. It should be appreciated that many other load indicators can be defined for general application among sub-grids or for specific application depending on the interest associated with the sub-grid. Furthermore, it should be understood, that the present invention encompasses use of guidelines for selecting a node from a sub-grid to serve content of another node departing the sub-grid, regardless of whether the guidelines are based on load balancing, a particular load indicator, or another parameter.

With respect to the previously identified second scenario, when the node responsible for providing particular content wants to exit the sub-grid, and no other nodes are actively connected to the sub-grid, the node should continue to provide the content to the sub-grid until another node becomes available to provide the content. In one embodiment, the node remains fully connected to the sub-grid to provide the content until another node enters the sub-grid, wherein the other node entering the sub-grid is capable of providing the content. Once the other node enters the sub-grid, the content is transferred from the node exiting the sub-grid to the node having entered the sub-grid. With respect to any embodiment described herein, time limits can be set on how long content should be maintained in a sub-grid. Thus, content being persisted in an empty sub-grid may be allowed to expire after a specified period of time. The specified period of time may also be correlated to a threshold activity level within the sub-grid.

In another embodiment, the node retains a partial presence in the sub-grid while waiting for another node to enter the sub-grid. The partial presence is defined by the node maintaining the content without actively participating in the sub-grid. Since there are no other nodes in the sub-grid to request content, node resources required to maintain the partial presence are minimal. Therefore, the node that is intent on exiting the sub-grid can function outside of the sub-grid while maintaining the partial presence in the sub-grid. However, the node continues to monitor the sub-grid for entry of another node to which responsibility for serving the sub-grid content can be transferred. Upon entry into the sub-grid of another node capable of serving the content, the content is transferred from the node maintaining the partial presence to the entering node, thereby enabling exit from the sub-grid of the node maintaining the partial presence.

In another embodiment, the node intent on exiting the sub-grid selects another node from a pool of nodes that have volunteered to provide resources when necessary to maintain content in an empty sub-grid. Once selected, the exiting node transfers the content for which it is responsible to the volunteer node. The volunteer node then operates to provide the content to the sub-grid. The selected volunteer node can either fully enter the sub-grid, i.e., become active in the sub-grid, or partially enter the sub-grid, i.e., maintain a partial presence in the sub-grid. Thus, if the volunteer node is not interested in entering the sub-grid, the volunteer node can simply provide its resources to keep the sub-grid alive without actively participating in the sub-grid.

In one embodiment, the notification mechanism discussed in the related application entitled "System and Method for Notification within Decentralized Network", U.S. patent application Ser. No. 10/856,565, may be used to create and use the volunteer pool of nodes. For example, each node in the P2P network interested in participating in the volunteer pool, can subscribe to a registry defining the volunteer pool. In one example, the registry may be maintained under a hash value corresponding "resource volunteer." Thus, whenever a search is done across the P2P network for "resource volunteer," the search will locate the node responsible for maintaining the volunteer registry. Once located, a volunteer node can be selected from the volunteer registry. It should be appreciated that the aforementioned notification mechanism can be applied in a variety of different ways to assist in defining, maintaining, and utilizing the volunteer pool of nodes, as described herein. Additionally, it should be appreciated that the volunteer pool of nodes can be defined and maintained in a variety of ways that may not be explicitly exemplified herein. Therefore, it should be understood that the present invention encompasses the organization and use of one or more willing nodes from within a P2P network to provide resources for keeping content alive within an empty sub-grid.

Figure 1C:
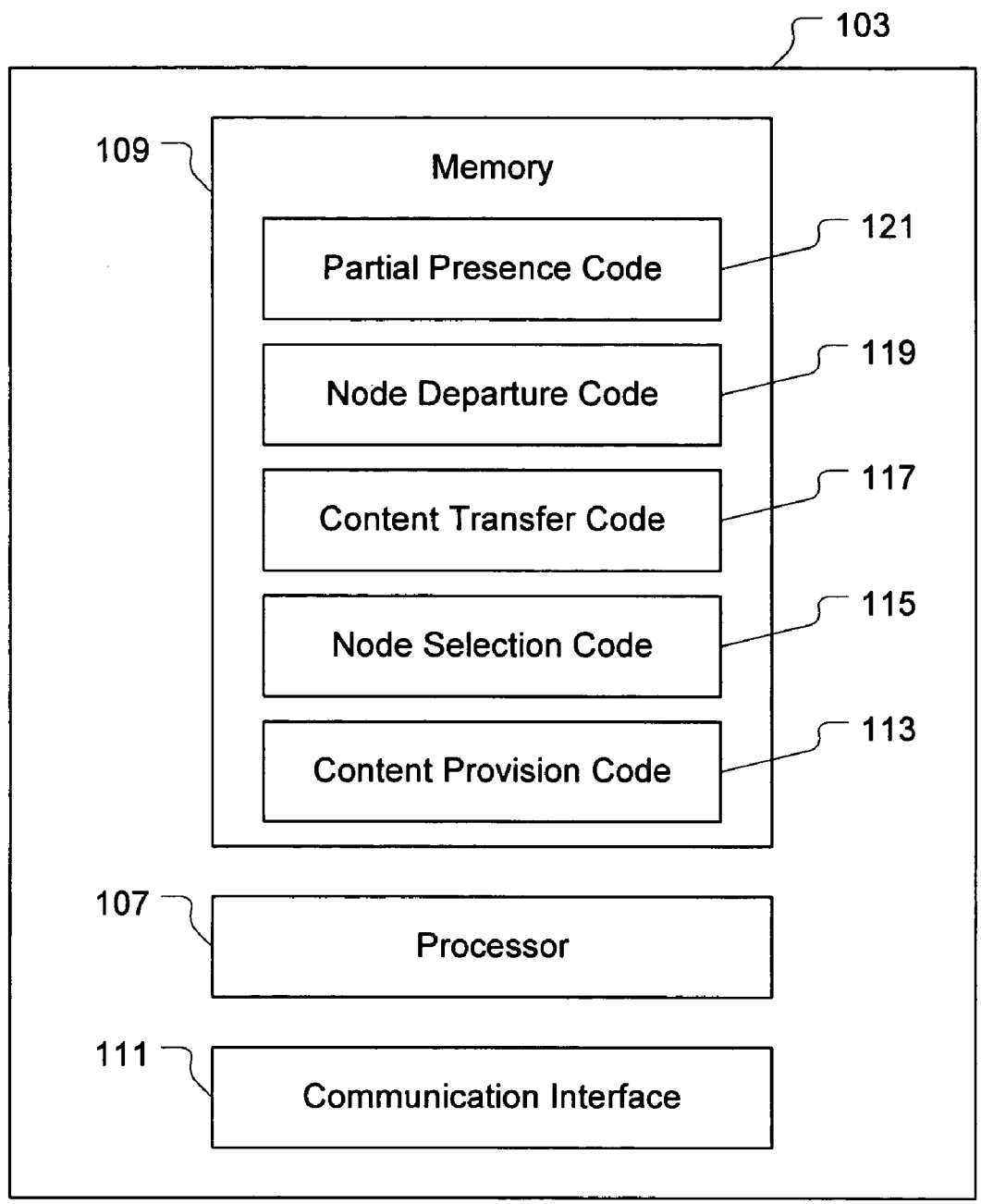
FIG. 1C is an illustration showing a block diagram of an exemplary node configured to ensure persistence of content within the sub-grid, in accordance with one embodiment of the present invention.

Each node within the P2P network represents a computing system configured to implement the requirements of the present invention for ensuring persistence of content within a sub-grid. FIG. 1C is an illustration showing a block diagram of an exemplary node 103 configured to ensure persistence of content within the sub-grid, in accordance with one embodiment of the present invention. The node 103 includes a processor 107, a memory 109, and communication interface logic 111. It should be appreciated that the processor 107 and memory 109 can represent any compatible combination of processor and memory as known to those skilled in the art. The communication interface logic 111 is defined to enable either wired or wireless communication with one or more other nodes within the P2P network. Additionally, the node 103 can include other common computer components and peripheral devices, such as storage components, display components, user interface components, etc.

The memory 109 includes content provision code 113, node selection code 115, content transfer code 117, node departure code 119, and partial presence code 121. The content provision code 113 is defined to enable the node 103 to provide content to the sub-grid to which it is connected. Thus, the content provision code 113 represents means for operating the node 103 to provide content within the sub-grid of the decentralized network. The node selection code 115 is defined to enable the node 103 to select another node from the P2P network that is capable of providing the content to the sub-grid, for which the node 103 is responsible. Thus, the node selection code 115 represents means for selecting a node to continue providing the content within the sub-grid upon departure of the node 103 from the sub-grid. The content transfer code 117 is defined to enable the node 103 to transfer the content for which it is responsible to the node selected in accordance with the node selection code 115 ("selected node"). Thus, the content transfer code 117 represents means for transferring the content from the node 103 to the selected node. The node departure code 119 is defined to enable the node 103 to depart the sub-grid upon successful transfer of its content provision responsibility to the selected node. Thus, the node departure code 119 represents means for causing the node 103 to depart the sub-grid. The partial presence code 121 is defined to enable the node 103 to maintain a partial presence in the sub-grid when another node is unavailable to receive content provision responsibility from the node 103. The partial presence code 121 directs the node 103 to maintain the data associated with the sub-grid content for which it is responsible, while enabling the node 103 to disengage from the sub-grid. Thus, the partial presence code 121 represents means for allowing the node 103 to disengage from the sub-grid while preserving the sub-grid content for which the node 103 is responsible.

In accordance with the foregoing, a peer, i.e., node, that creates content within a sub-grid will remain connected to the sub-grid at least until another peer connects to the sub-grid, wherein the other peer is capable of serving the content. Once the other peer connects to the sub-grid, the newly created content can be transferred to the other peer to be served, thus allowing the peer that had created the content to disconnect from the sub-grid. For example, consider a peer that has painted a picture in a virtual environment representing the interest of a sub-grid. Further, consider that the peer wishes to leave the virtual environment and disconnect from the sub-grid. If another peer is present in the sub-grid, the other peer can be given the picture data to serve to the sub-grid. If no other peers are present in the sub-grid, the peer having created the picture can hold on to the picture data until another peer capable of serving the picture data enters the sub-grid. Then, when another peer becomes available, the other peer can be given the picture data to serve to the sub-grid. Alternatively, if no other peers are present in the sub-grid, the peer having created the picture can transfer the picture data to a volunteer peer from a pool of volunteer peers. The volunteer peer will serve the picture data content to future peers that connect to the sub-grid. Additionally, lifetimes of dynamic content can be established by an underlying application such that old content may expire.

As described above, the present invention provides for persistence of content changes or additions made by a peer within a sub-grid of a P2P network, even after the peer exits the sub-grid in which the content changes or additions were made. Essentially, the present invention ensures persistence of the content changes or additions by passing on ownership thereof to another peer who either enters the respective sub-grid or volunteers to serve the content within the sub-grid. Exemplary method embodiments of the present invention are further described below with respect to FIGS. 2 through 4.

Figure 2:
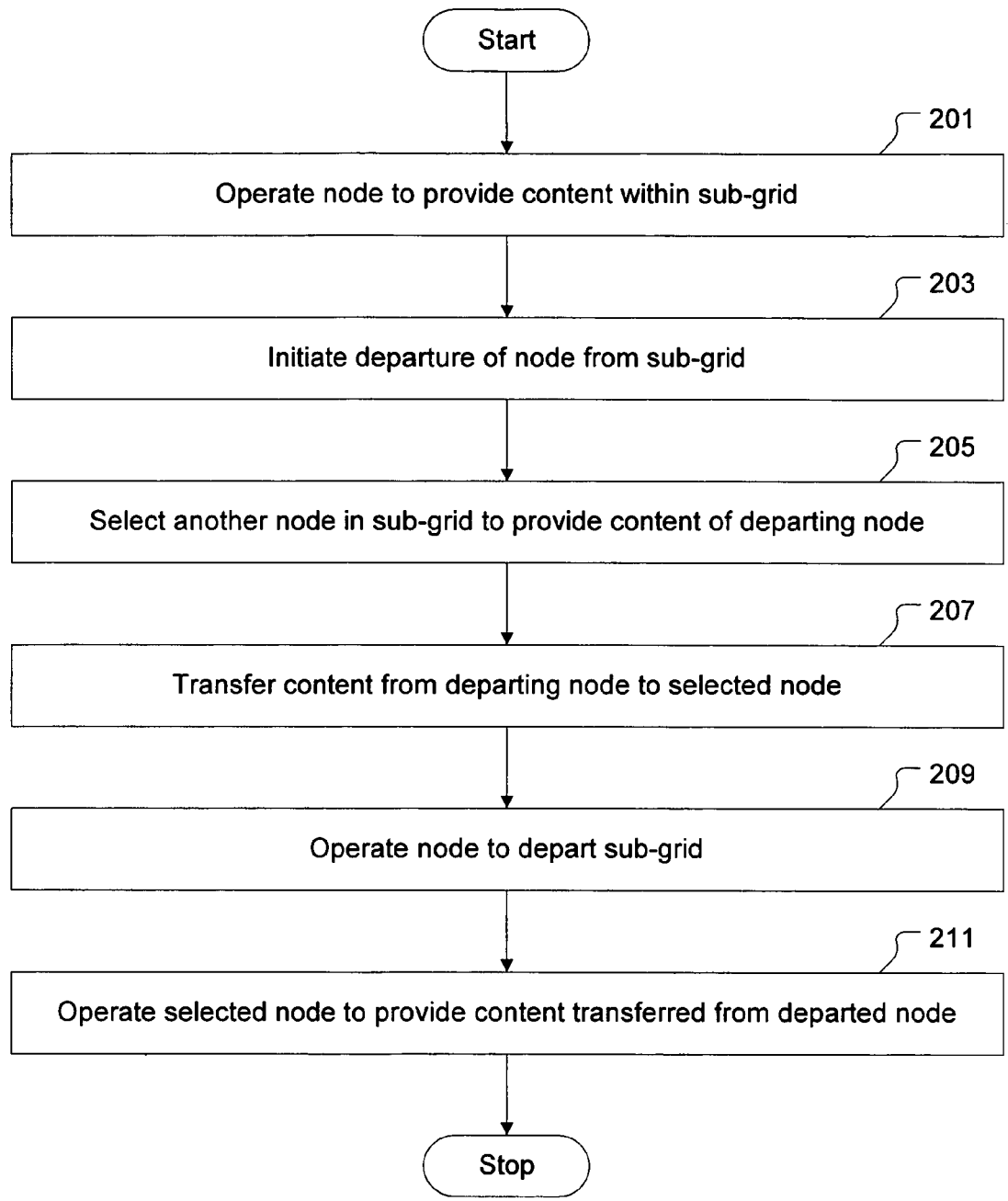
FIG. 2 is an illustration showing a flowchart of a method for ensuring persistence of content within a sub-grid having a plurality of nodes connected thereto, in accordance with one embodiment of the present invention.

FIG. 2 is an illustration showing a flowchart of a method for ensuring persistence of content within a sub-grid having a plurality of nodes connected thereto, in accordance with one embodiment of the present invention. In an operation 201, a node is operated to provide content within the sub-grid. An operation 203 is then provided to initiate departure of the node from the sub-grid. In an operation 205, another node connected to the sub-grid is selected to provide the content for which the departing node is responsible. The operation 205 can be performed using either of the node selection mechanisms previously discussed with respect to the first scenario. An operation 207 is then performed to transfer the content from the departing node to the selected node. Once the content is transferred from the departing node to the selected node, the departing node is operated to depart the sub-grid in an operation 209. In an operation 211, the content having been transferred from the departing node to the selected node is provided to the sub-grid by the selected node.

Figure 3:
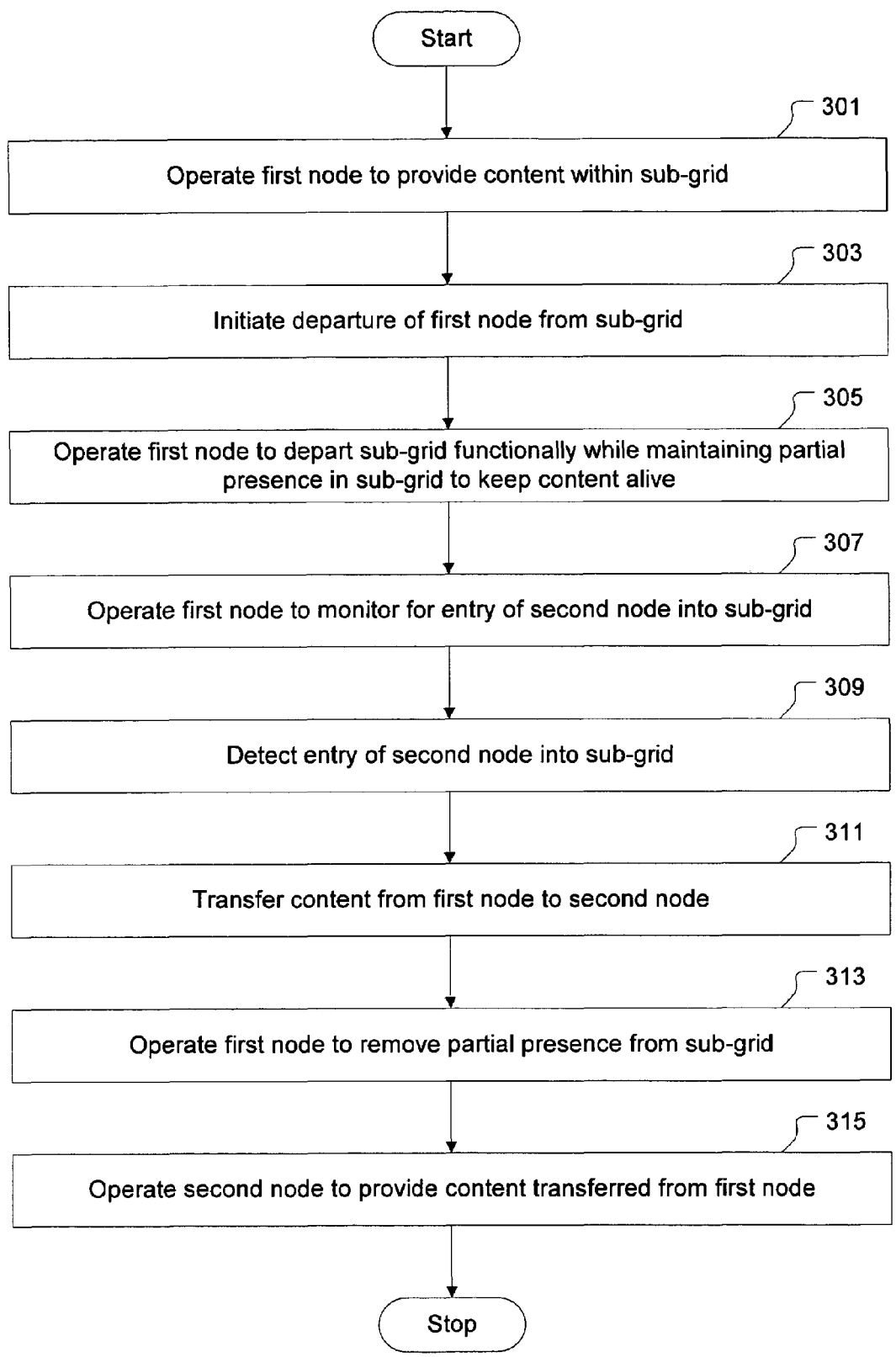
FIG. 3 is an illustration showing a flowchart of a method for ensuring persistence of content within a sub-grid having a single node connected thereto, in accordance with one embodiment of the present invention.

FIG. 3 is an illustration showing a flowchart of a method for ensuring persistence of content within a sub-grid having a single node connected thereto, in accordance with one embodiment of the present invention. In an operation 301, a first node is operated to provide content within the sub-grid. An operation 303 is then provided to initiate departure of the first node from the sub-grid. In an operation 305, the first node is operated to depart the sub-grid functionally while maintaining a partial presence in the sub-grid. As described previously with respect to the second scenario, maintaining the partial presence refers to the first node retaining data that defines the content within the sub-grid. Since there are no other nodes in the sub-grid requesting the content, the first node does not need to actively participate in the sub-grid. Thus, the first node is capable of performing tasks outside of the sub-grid while also retaining the data associated with the sub-grid. In an operation 307, the first node is operated to monitor the sub-grid for entry of a second node. Entry of the second node into the sub-grid is detected in an operation 309. Following detection of the second node in the sub-grid, an operation 311 is performed to transfer the content of the sub-grid having been retaining by the first node to the second node. Once the content is transferred from the first node to the second node, an operation 313 is performed to remove the partial presence of the first node from the sub-grid. In an operation 315, the content having been transferred from the first node to the second node is provided to the sub-grid by the second node.

Figure 4:
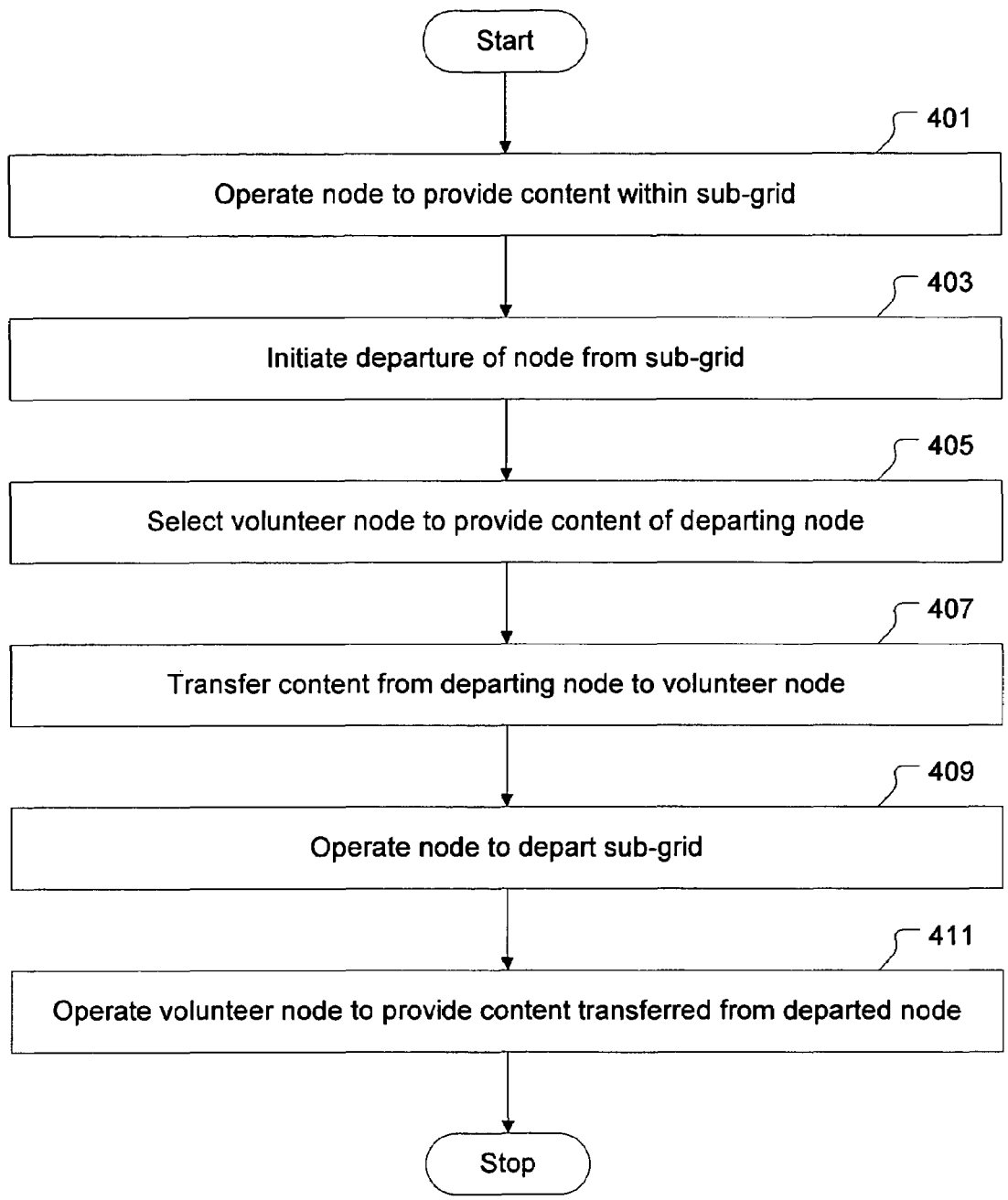
FIG. 4 is an illustration showing a flowchart of a method for ensuring persistence of content within an empty sub-grid, in accordance with one embodiment of the present invention.

FIG. 4 is an illustration showing a flowchart of a method for ensuring persistence of content within an empty sub-grid, in accordance with one embodiment of the present invention. In an operation 401, a node connected to the sub-grid is operated to provide content within the sub-grid. In an operation 403, departure of the node from the sub-grid is initiated. An operation 405 is then performed to select a volunteer node to provide content to the sub-grid for which the departing node 405 is responsible. In one embodiment, the volunteer node can be selected from a pool of volunteer nodes which have agreed to provide resources when necessary to keep content of an empty sub-grid alive. Once the volunteer node is selected, an operation 407 is performed to transfer the sub-grid content from the departing node to the volunteer node. Then, an operation 409 is performed in which the departing node is operated to depart the sub-grid. In an operation 411, the volunteer node is operated to provide the content transferred from the departed node to the sub-grid.

While embodiments described herein refer to a P2P network, it should be understood that the P2P network can be used for many purposes. For example, gaming applications can use a P2P network to interconnect and interact between two or more gaming applications and/or between two of more gaming consoles. The P2P network can also provide the intercommunication for enabling interactive gaming applications that can be used, i.e., played, by two or more users. Additionally, embodiments of the present invention as described herein may be incorporated into a computing device. The computing device may be represented as a video game console. For example, the computing device may be the "PLAYSTATION 2"® video game console manufactured by Sony Computer Entertainment Inc.

It should be appreciated that the embodiments described herein may also apply to on-line gaming applications. That is, the embodiments described herein may occur in a P2P network environment that sends a signal to multiple users, i.e., nodes or peers, over a distributed network (e.g., the Internet, LAN, WAN, wireless network, etc.) to enable players at remote locations to communicate and interact with each other. It should be further appreciated that embodiments described herein may be implemented as either hardware, software, or a combination thereof.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A method for ensuring persistence of data content within a sub-grid of a decentralized network, comprising:
    operating a number of nodes to form a sub-grid based on a common interest, wherein a first node operating within the sub-grid is responsible for providing data content to the sub-grid, wherein the number of nodes operate in a cooperative manner to provide data content to define the common interest;
    selecting a second node to provide to the sub-grid the data content for which the first node is responsible;
    transferring the data content for which the first node is responsible from the first node to the second node;
    causing the first node to exit the sub-grid; and
    operating the second node to provide the data content transferred from the first node.

2. A method for ensuring persistence of data content within a sub-grid of a decentralized network as recited in claim 1, wherein the second node is selected from nodes operating within the sub-grid.

3. A method for ensuring persistence of data content within a sub-grid of a decentralized network as recited in claim 2, wherein the second node is selected randomly from nodes operating within the sub-grid.

4. A method for ensuring persistence of data content within a sub-grid of a decentralized network as recited in claim 2, wherein the second node is selected based on applying a set of guidelines to nodes operating within the sub-grid.

5. A method for ensuring persistence of data content within a sub-grid of a decentralized network as recited in claim 4, wherein application of the set of guidelines serves to generate a load indicator for each node operating within the sub-grid.

6. A method for ensuring persistence of data content within a sub-grid of a decentralized network as recited in claim 5, wherein the second node is selected based on having a load indicator representing a lower load relative to other nodes operating within the sub-grid.

7. A method for ensuring persistence of data content within a sub-grid of a decentralized network as recited in claim 5, wherein the load indicator represents one of a number of objects being provided to the sub-grid, an amount of data being provided to the sub-grid, and an amount of data per unit time being provided to the sub-grid.

8. A method for ensuring persistence of data content within a sub-grid of a decentralized network as recited in claim 1, wherein the second node is selected from a volunteer pool of nodes operating outside of the sub-grid.

9. A method for ensuring persistence of data content within a sub-grid of a decentralized network as recited in claim 8, wherein operating the second node to provide the data content transferred from the first node includes operating the second node to actively participate in the sub-grid.

10. A method for ensuring persistence of data content within a sub-grid of a decentralized network as recited in claim 8, wherein operating the second node to provide the data content transferred from the first node includes operating the second node to establish a partial presence within the sub-grid.

11. A method for ensuring persistence of data content within a sub-grid of a decentralized network as recited in claim 10, wherein the partial presence includes storing data content for the sub-grid without actively participating in the sub-grid.

12. A method for ensuring persistence of data content within a sub-grid of a decentralized network as recited in claim 10, further comprising:
    operating the second node to discontinue providing the data content transferred from the first node upon expiration of a time limit associated with the data content transferred from the first node.

13. A method for ensuring persistence of data content within a sub-grid of a decentralized network as recited in claim 1, wherein the sub-grid is defined as a fully connected grid within a peer-to-peer network.

14. A computer readable media including program instructions for ensuring persistence of data content within a sub-grid of a decentralized network, comprising:
    program instructions for operating a number of nodes to form a sub-grid based on a common interest, wherein a first node operating within the sub-grid is responsible for providing data content to the sub-grid, wherein the number of nodes operate in a cooperative manner to provide data content to define the common interest;
    program instructions for selecting a second node to provide to the sub-grid the data content for which the first node is responsible;
    program instructions for transferring the data content for which the first node is responsible from the first node to the second node;
    program instructions for operating the first node to exit the sub-grid; and
    program instructions for operating the second node to provide the data content transferred from the first node.

15. A computer readable media including program instructions for ensuring persistence of data content within a sub-grid of a decentralized network as recited in claim 14, wherein the program instructions for selecting the second node are defined to direct the second node to be selected from nodes operating within the sub-grid.

16. A computer readable media including program instructions for ensuring persistence of data content within a sub-grid of a decentralized network as recited in claim 15, wherein the program instructions for selecting the second node are defined to direct the second node to be selected randomly from nodes operating within the sub-grid.

17. A computer readable media including program instructions for ensuring persistence of data content within a sub-grid of a decentralized network as recited in claim 15, wherein the program instructions for selecting the second node are defined to direct the second node to be selected based on applying a set of guidelines to nodes operating within the sub-grid.

18. A computer readable media including program instructions for ensuring persistence of data content within a sub-grid of a decentralized network as recited in claim 17, wherein application of the set of guidelines serves to generate a load indicator for each node operating within the sub-grid.

19. A computer readable media including program instructions for ensuring persistence of data content within a sub-grid of a decentralized network as recited in claim 18, wherein the program instructions for selecting the second node are defined to direct the second node to be selected based on having a load indicator representing a lower load relative to other nodes operating within the sub-grid.

20. A computer readable media including program instructions for ensuring persistence of data content within a sub-grid of a decentralized network as recited in claim 18, wherein the load indicator represents one of a number of objects being provided to the sub-grid, an amount of data being provided to the sub-grid, and an amount of data per unit time being provided to the sub-grid.

21. A computer readable media including program instructions for ensuring persistence of data content within a sub-grid of a decentralized network as recited in claim 14, wherein the program instructions for selecting the second node are defined to direct the second node to be selected from a volunteer pool of nodes operating outside of the sub-grid.

22. A computer readable media including program instructions for ensuring persistence of data content within a sub-grid of a decentralized network as recited in claim 21, wherein the program instructions for operating the second node to provide the data content transferred from the first node include program instructions for operating the second node to actively participate in the sub-grid.

23. A computer readable media including program instructions for ensuring persistence of data content within a sub-grid of a decentralized network as recited in claim 21, wherein the program instructions for operating the second node to provide the data content transferred from the first node include program instructions for operating the second node to establish a partial presence within the sub-grid.

24. A computer readable media including program instructions for ensuring persistence of data content within a sub-grid of a decentralized network as recited in claim 23, wherein the partial presence includes storing data content for the sub-grid without actively participating in the sub-grid.

25. A computer readable media including program instructions for ensuring persistence of data content within a sub-grid of a decentralized network as recited in claim 23, further comprising:
program instructions for operating the second node to discontinue providing the data content transferred from the first node upon expiration of a time limit associated with the data content transferred from the first node.

26. A computer readable media including program instructions for ensuring persistence of data content within a sub-grid of a decentralized network as recited in claim 14, wherein the sub-grid is defined as a fully connected grid within a peer-to-peer network.

27. A method for ensuring persistence of data content within an empty sub-grid, comprising:
operating a first node within a sub-grid, wherein the sub-grid is based on a common interest, wherein nodes other than the first node are absent from the sub-grid, the first node being responsible for providing data content to the sub-grid to define the common interest; and
operating the first node to establish a partial presence within the sub-grid, wherein the partial presence enables the first node to cease operation within the sub-grid while maintaining the data content provision by the first node to the sub-grid.

28. A method for ensuring persistence of data content within an empty sub-grid as recited in claim 27, further comprising:
operating the first node to monitor the sub-grid for operation of a second node within the sub-grid;
detecting operation of the second node within the sub-grid;
transferring the data content for which the first node is responsible from the first node to the second node;
operating the first node to exit the sub-grid; and
operating the second node to provide the data content transferred from the first node.

29. A method for ensuring persistence of data content within an empty sub-grid as recited in claim 27, further comprising:
operating the second node to discontinue providing the data content transferred from the first node upon expiration of the data content transferred from the first node.

30. A method for ensuring persistence of data content within an empty sub-grid as recited in claim 27, wherein the sub-grid is defined as a fully connected grid within a peer-to-peer network.

31. A computer readable media including program instructions for ensuring persistence of data content within an empty sub-grid, comprising:
program instructions for operating a first node within a sub-grid, wherein the sub-grid is based on a common interest, wherein nodes other than the first node are absent from the sub-grid, the first node being responsible for providing data content to the sub-grid to define the common interest; and
program instructions for operating the first node to establish a partial presence within the sub-grid, wherein the partial presence enables the first node to cease operation within the sub-grid while maintaining the data content provision by the first node to the sub-grid.

32. A computer readable media including program instructions for ensuring persistence of data content within an empty sub-grid as recited in claim 31, further comprising:
program instructions for operating the first node to monitor the sub-grid for operation of a second node within the sub-grid;
program instructions for detecting operation of the second node within the sub-grid;
program instructions for transferring the data content for which the first node is responsible from the first node to the second node;
program instructions for operating the first node to exit the sub-grid; and
program instructions for operating the second node to provide the data content transferred from the first node.

33. A computer readable media including program instructions for ensuring persistence of data content within an empty sub-grid as recited in claim 31, further comprising:

program instructions for operating the second node to discontinue providing the data content transferred from the first node upon expiration of a time limit associated with the data content transferred from the first node.

34. A computer readable media including program instructions for ensuring persistence of data content within an empty sub-grid as recited in claim 31, wherein the sub-grid is defined as a fully connected grid within a peer-to-peer network.

35. A computing device, comprising:

a processor; and a memory capable of storing program instructions to be executed by the processor, the program instructions including, computer code for providing data content within a sub-grid of a peer-to-peer network, wherein the sub-grid is based on a common interest shared among a number of computing devices, wherein the number of computing devices operate in a cooperative manner to provide data content to define the common interest, computer code for selecting another computing device to which responsibility for providing the data content within the sub-grid can be passed, computer code for transferring the data content to a selected computing device, and computer code for enabling the computing device to disconnect from the sub-grid upon successfully transferring the data content to the selected computing device.

36. A computing device as recited in claim 35, wherein the computer code for selecting another computing device is defined to cause the other computing device to be selected from computing devices present within the sub-grid.

37. A computing device as recited in claim 35, wherein the computer code for selecting another computing device is defined to cause the other computing device to be selected from a volunteer pool of computing devices present outside the sub-grid.

38. A computing device as recited in claim 35, wherein the computer code for selecting another computing device is defined to cause the other computing device to be selected in a random manner.

39. A computing device as recited in claim 35, wherein the computer code for selecting another computing device is defined to cause the other computing device to be selected in accordance with a set of guidelines.

40. A computing device as recited in claim 39, wherein the set of guidelines are defined to preserve a load balance among computing devices present within the sub-grid.

41. A computing device as recited in claim 35, wherein the computing device is a game console.

42. A decentralized network, comprising:

a plurality of interconnected nodes forming a sub-grid, wherein the sub-grid is based on a common interest shared among the plurality of interconnected nodes, and wherein each of the plurality of interconnected nodes provides data content to the sub-grid; and a data content persistence service deployed to operate on each of the plurality of interconnected nodes, the data content persistence service defined to ensure that data content provided by a first node to the sub-grid will be retained within the sub-grid upon departure of the first node from the sub-grid.

43. A decentralized network as recited in claim 42, wherein the data content persistence service operates to transfer data content provided by the first node to a second node present within the sub-grid, wherein the data content transfer occurs prior to departure of the first node from the sub-grid.

44. A decentralized network as recited in claim 43, wherein the data content persistence service operates to select the second node to which the data content is to be transferred based on a set of guidelines defined to preserve a load balance among nodes present within the sub-grid.

45. A decentralized network as recited in claim 42, wherein the data content persistence service operates to transfer data content provided by the first node to a volunteer node existing outside the sub-grid, wherein the data content transfer occurs prior to departure of the first node from the sub-grid.

46. A decentralized network as recited in claim 42, wherein the data content persistence service operates to direct the first node to retain a partial presence within the sub-grid to preserve the data content provided by the first node to the sub-grid.

47. A data content persistence mechanism for deployment across a decentralized network, comprising:

means for operating a first node to provide data content within a sub-grid of the decentralized network, wherein the sub-grid is based on a common interest, and wherein a number of nodes operate in a cooperative manner to provide data content to define the common interest;

means for selecting a second node to continue providing the data content within the sub-grid upon departure of the first node from the sub-grid;

means for transferring the data content from the first node to the second node;

means for causing the first node to depart the sub-grid; and means for operating the second node to provide the data content transferred from the first node.

48. A data content persistence mechanism for deployment across a decentralized network as recited in claim 47, further comprising:

means for operating the first node to establish a partial presence within the sub-grid, wherein the partial presence enables the first node to cease operation within the sub-grid while maintaining the data content provision by the first node to the sub-grid.

* * * * *